United States Patent [19]

Grant

[11] Patent Number: 4,689,737
[45] Date of Patent: Aug. 25, 1987

[54] INTEGRATED ENVIRONMENT COMPUTER SYSTEM CONTROL STRUCTURE WITH NATURAL LANGUAGE INTERFACE

[76] Inventor: Richard B. Grant, 3828 Woodcliff Rd., Sherman Oaks, Calif. 91403

[21] Appl. No.: 604,638

[22] Filed: Apr. 27, 1984

[51] Int. Cl.⁴ .............................................. G06F 3/153
[52] U.S. Cl. ..................................................... 364/200
[58] Field of Search ... 364/200 MS File, 900 MS File, 364/521; 340/731, 734, 721, 745

[56] References Cited

U.S. PATENT DOCUMENTS 4,428,065 1/1984 Duvall et al. ...................... 364/900
4,555,775 11/1985 Pike .................................... 364/900

OTHER PUBLICATIONS

James D. Foley and Andries VanDam, *Fundamentals of Interactive Computer Graphics*, Addison-Wesley Publishing Company, Reading, Mass., 1982.
Rob Pike, "Graphics in Overlapping Bitmap Layers", Computer Graphics, vol. 17, No. 3, Jul. 1983, pp. 331–356.

*Primary Examiner*—Thomas M. Heckler
*Attorney, Agent, or Firm*—Robert R. Jackson

[57] ABSTRACT

A computer system including text input and display devices. A display manager receives text from the input device and causes the display device to display that text on a first display level. The display manager also causes other display levels to be displayed so that they are perceived as being successively posteriorly positioned relative to the first level. Text received from the input device is also accumulated and compared to previously stored text segments to cause performance of program task elements that are associated with the stored text segments matching the received text. The display manager causes text produced by the performed task elements to be directed to and perceptually represented on the appropriate posterior display levels.

11 Claims, 6 Drawing Figures

INTEGRATED ENVIRONMENT COMPUTER SYSTEM CONTROL STRUCTURE WITH NATURAL LANGUAGE INTERFACE

BACKGROUND OF THE INVENTION

1. Technical Field

The present invention relates generally to human operated computer workstations and terminal oriented computer systems and, more particularly, to a modularly structured computer control system providing a natural language interface allowing the synonymic referencing of the operative modules, or primative tasks, present therein and the perceptually channeled reflection of information provided to the system and the corresponding presentation of information returned by the system in specific response thereto.

2. Description of the Prior Art

The ability to efficiently utilize the available capabilities of modern computers is becoming increasingly limited by the degree of interactiveness of the user interface. Computers are only sophisticated tools that require the creative direction of an operator in order to accomplish useful work. That is, the heuristic abilities of the operator are required to augment the computational speed and accuracy of the computer. For the efficient application of the operator's heuristic abilities, the user interface must functionally reflect the abstracted manner in which the operator is capable of and, indeed, desires to interact with the computer. A further consideration in the functionality of the user interface is the operator's heuristic abilities to extract contextual or relational information from otherwise raw data, complicated by the limited raw data retention capability of the operator. Thus, the user interface must be capable of perceptually providing a great deal of computed information, all concurrently, to the operator. However, the perceptual means for communicating to the operator is generally quite limited. The video terminal is perhaps the most common computer communication device, yet its display area and corresponding available textual density is severely limited in comparison to the heuristic communication abilities of the operator. This is perhaps most evident in typical computer systems in their failure to perceptually discriminate between even the immediate representation of information provided to the system and such information generated, or retrieved, by the system and perceptually returned to the operator.

Typical user interfaces designed to facilitate the interaction between the user and the computer system utilize sequences of menus. These menus continually present the operator with the available courses of action, or features of the system to which access is immediately allowable. However, these menu maps also rigidly fix the trail that must be traversed by the operator in order to execute or even to arrive at a desired task.

Substantially more sophisticated user interfaces utilize artificial intelligence in the attempt to comprehend the requests and commands of the operator. The necessary contextual vagueness of even the most tersely phrased command or request, due to the otherwise unrestricted use of the human language, leads to the use of extremely complex computer systems as a minimum requirement for the support of the user interface. The extent of the support required may even be to the reasonable exclusion of the system's further ability to act on the command or request, once understood by the system.

The menu driven user interface, most typically, can be supplemented by a multiple window display technique. Windowing typically provides the successive partial overlay of menus by subsequent menus or information provided by the system in response to a request by the operator. While the textual amount of information available to the operator is not actually increased, there is a perceived increase due to the concurrentness of presentation. However, substantial information is obscured by subsequently presented menus, thereby reducing the concurrency of information available for consideration. Further, the operator's choice of information that can be displayed in concurrently presented windows is limited by the rigidity of the menu nature of the user interface.

SUMMARY OF THE INVENTION

Therefore, a purpose of the present invention is to provide an ihtegrated environment computer control system having a natural language and channeled display user interface.

This is accomplished in the present invention by a computer system comprising means for the input of textual information, means for the display of textual information, a display manager associated with the text input means for receiving text therefrom, and further associated with the text display means for the perceptual representation of the text received from the text input means on the first of one or more display levels, the succeeding ones of the levels being perceptually plane parallel and successively posteriorly positioned with respect to the first level, an input text buffer associated with the text input means for receiving text therefrom, a parser associated with the input buffer for periodically receiving text accumulated by the input text buffer and preparing an input text segment therefrom, a list buffer including a plurality of associative text segments, and a plurality of operative task elements, each associated with at least one of the associative text segments of the list buffer, the parser including a list processor for comparing the input text segment with the associative text segments, each of the task elements being futher associated with the display manager whereby text provided by the task elements is directed to and perceptually represented on the posterior display levels.

Thus, an advantage of the present invention is that it establishes a fully integrated environment that encompasses both the operator and the computer system.

Another advantage of the present invention is that it effectively provides an integral natural language driven user interface.

A further advantage of the present invention is that the user interface perceptually responds to the operator through a multi-level display organized to optimally provide relational as well as textual information to the operator.

Still another advantage of the present invention is that it allows fully independant system modules to be integrally incorporated into the overall computer system as operative task elements.

Yet another advantage of the present invention is that it provides for a completely recursive command structure.

A still further advantage of the present invention is that the natural language interface is dynamic, allowing the creation, redefinition and retention of a natural language vocabulary preferentially over either an initially preferred or subsequently modified and retained vocabulary.

BRIEF DESCRIPTION OF THE DRAWINGS

Other attendant features and further advantages of the present invention will become apparent and readily understood by reference to the following Detailed Description of the Invention when considered in conjunction with the accompanying Drawings, wherein like reference numbers indicate like parts throughout the figures, and wherein.

DETAILED DESCRIPTION OF THE INVENTION

The present invention principally provides an optimal user interface for a computer system. In providing the interface, however, the present invention deterministically structures the computer system as an integrated environment. All operative elements of the system are modularized as tasks that can be directly referenced by the operator through the user interface. Immediate communication with the system, including all information provided by the operator as well as generated or retrieved by the system for immediate consideration by the operator, is preferably routed to a video display and, thereby, presented to the operator. The user interface provides for the maintenance of the relationships between the information displayed based on the source of the information, not only as between the operator and the system, but also with significant regard as to the particular modules within the system. Informational priorities established explicitly, particularly in the case of the information provided by the operator, or sequentially, as by default in the time order referenced or generated, determine the placement of the information on presentation planes, or perceptual levels, of the display. Preferably, the operator's information presentation plane is the anterior level in the sucessively posteriorly percepually placed levels. Thus, this plane is distiguished as generally always being present and perceptually providing an effective surface for display of the current commands and requests of the operator. Accordingly, it may be referred to as an "auricle" plane. Since the information provided on any of the remaining planes is sourced by corresponding task elements, an independent presentation capability is obtained while retaining the relational information content in accordance with the present invention. Although, information is generally returned by the system modules to sequentially utilized display planes, the information provided on any given plane may be effectively discarded, thus effectively increasing the availability of planes, or moved between otherwise available planes regardless of their order.

Consequently, the present invention provides a truly integrated environment computer system control structure. As such, it is neither limited to any particular computer hardware system nor does it require any unusually speciallized hardware system components. Therefore, it should be understood that the structure of the present invention is adaptable to provide a variety of embodiments, depending on the particular set of generalized hardware utilized, all implementing the present invention. In order not to obscure the structure of the present invention, only the design of the preferred embodiment of the present invention is described below.

Figure 1:
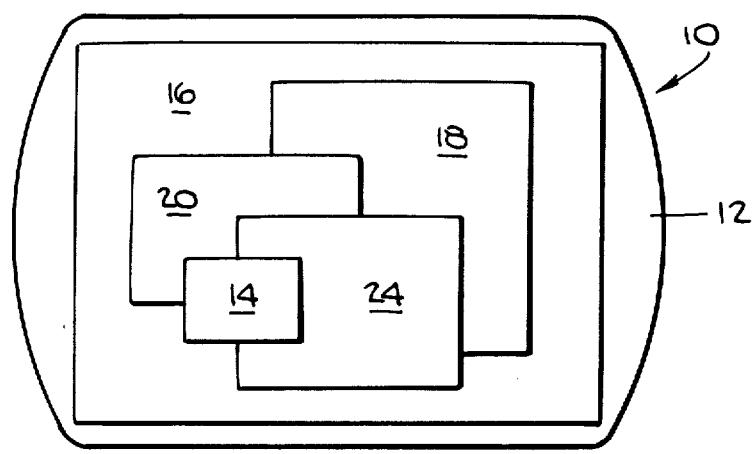
FIG. 1. is a front view of the sequentially posteriorly positioned display planes provided by the preferred embodiment of the present invention.

Referring now to FIG. 1, a perceptual representation of the display 10 of the present invention is shown. Preferably, a medium to high resolution CRT display 12 is used. Displayed thereby are a variable number of display planes, generally always including the auricle plane 14 and the rear plane 16. Intermediate planes, here represented by planes 18, 20, 24, are provided as needed between the rear plane 16 to the auricle plane 14. In the absence of explicit selection by the operator directly, or indirectly by the selection of the current task, sucessive intermediate planes are utilized based on the criteria that they be least obscuring or pre-emptive of currently displayed information.

Figure 2:
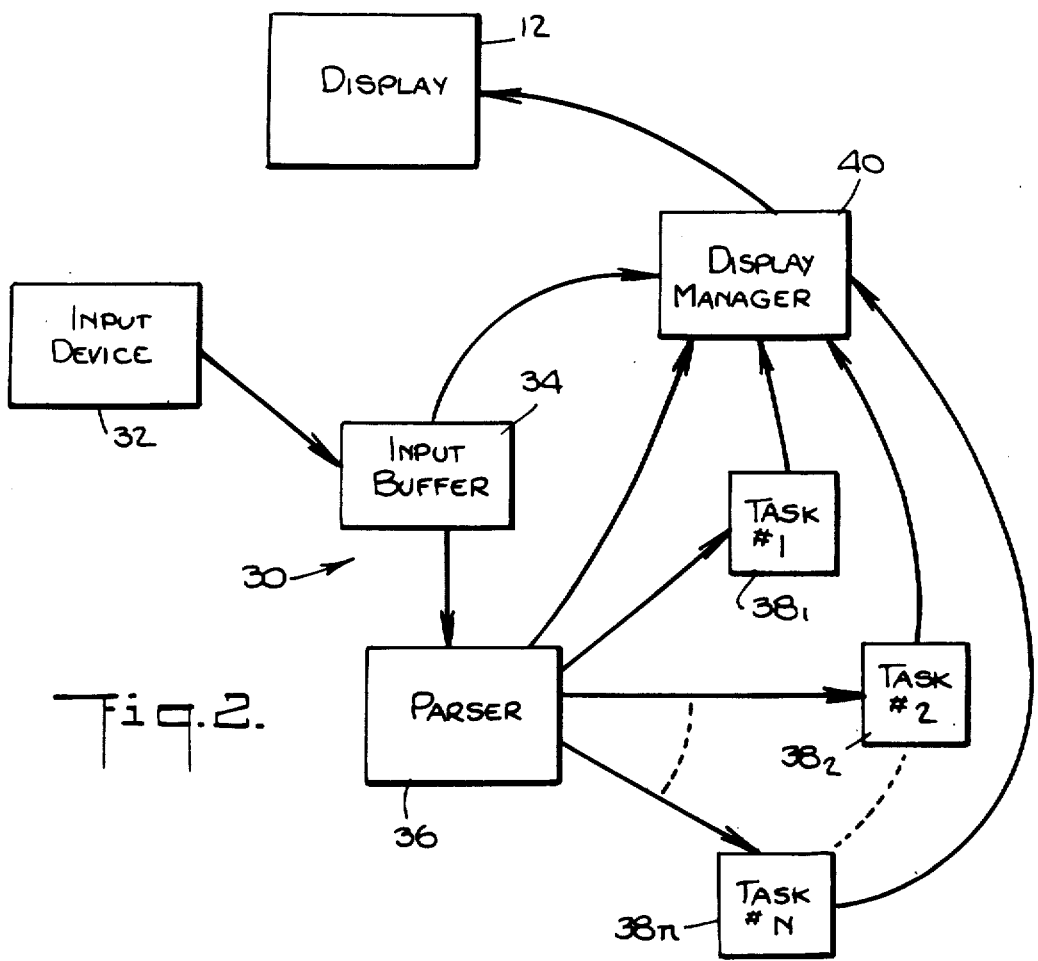
FIG. 2 is a block diagram of the preferred embodiment of the present invention.

The block diagram of the preferred embodiment of the present invention, as the essentially complete system 30, is shown in FIG. 2. The system 30 is comprised of an input device 32, preferably an ASCII keyboard, associated with an input buffer 34 and a display manager 40. Both the input buffer 34 and the display manager 40 preferably receive the keystroke textual information entered by the operator. The display manager 40 routes this keystroke data to the display 12 and, in particular, to the auricle plane 14 where it is perceptually displayed for the benefit of the operator. The keystroke data is accumulated by the input buffer 34 until terminated by a command by the operator, preferably a return/enter keystroke. The accumulated data is then passed to a parser 36 where it is parsed in comparison to a list of text segments. An exact or properly qualified comparison match results in the invocation of a corresponding task element $38_1-38_n$, whereupon the specified element $38_x$ performs its associated task. Any information retrieved or generated by the task elements $38_1-38_n$ is passed to the display manager 40 for presentation on an appropriate display plane. Failure of the parser 36 to find a match produces an error message that is passed to the display manager 40 for display on an appropriate, preferably dedicated, display plane of the display 12.

Figure 3:
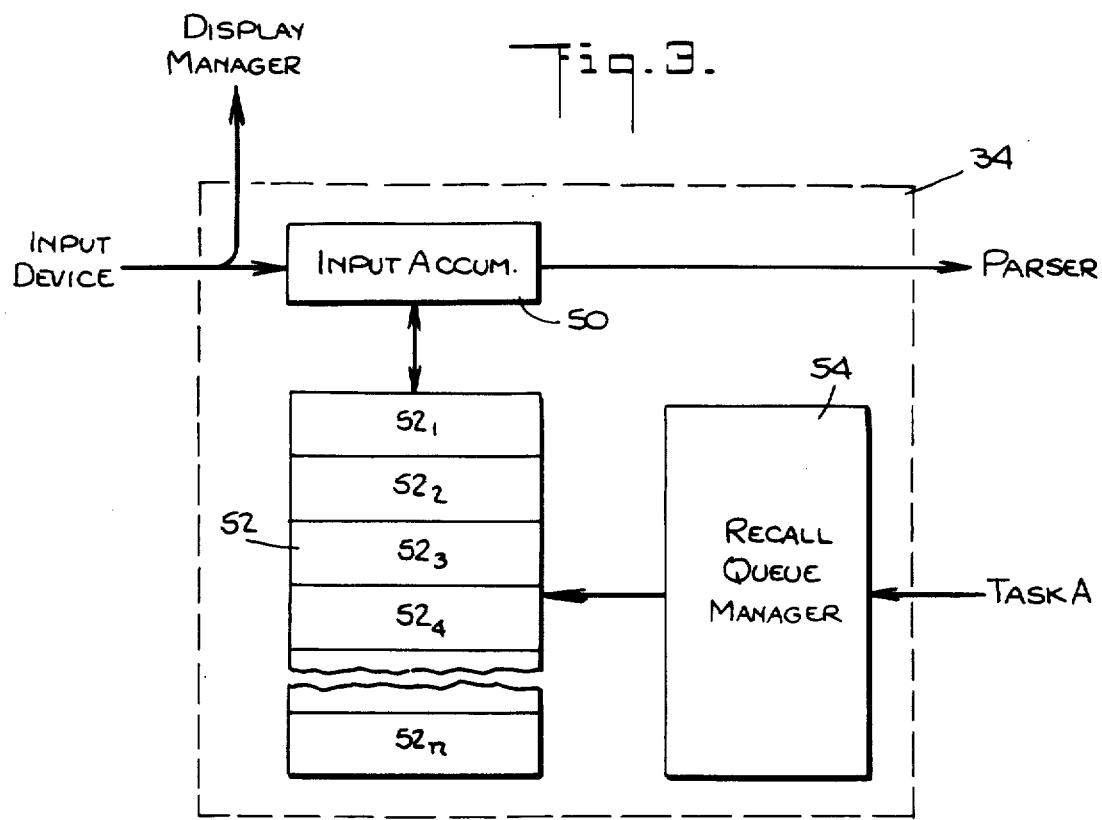
FIG. 3 is a block diagram of the input buffer of the preferred embodiment of the present invention.

Considering the input buffer 34 in more detail, reference is made to FIG. 3. The input buffer 34 essentially includes an input accumulator 50 and, preferably, a recall queue 52 and queue manager 54. The input accumulator 50 sequentially receives and stores the keystroke data from the input device 32. Upon reciept of the preferred return/enter command, the accumulated text segment is passed to the recall queue 52 and the parser 36. The accumulated text segment is stored in the first available register $52_1-52_n$ of the recall queue 52 under the control of the recall queue manager 54. As will be described in greater detail below, the function of a task element $38_1-38_n$ here identified as TASK A, preferably includes the sequential transfer of one or more of the stored accumulated text segments back to the input accumulator, followed by an enter command, in emulation of the operator's own input capabilities. An accumulated text segment that ultimately invokes TASK A may further specify that the transfer of a given sequence of queued accumulated text segments be repeated a given number of iterations. Thus, the fully recursive nature of the control structure of the present invention is evident.

Figure 4:
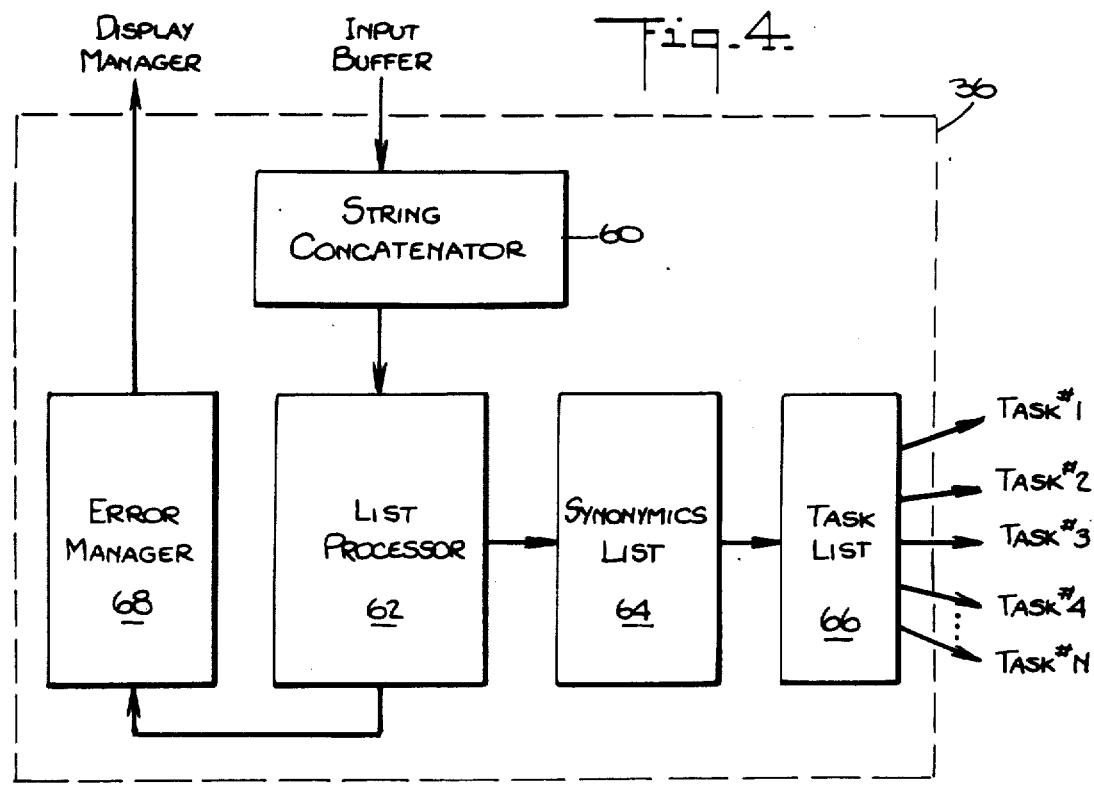
FIG. 4 is a block diagram of the parser of the preferred embodiment of the present invention.

FIG. 4 provides a detailed block diagram of the preferred elements of the parser 36. As indicated, the accumulated text segment is passed to a string concatenator 60. The accumulated text segment is concatenated by the concatenator 60 principly to remove any ASCII spaces embedded therein. Escape and control codes that may have been inadvertently entered by the operator may also be removed at this time. The concatenated text segment is then passed to a list processor 62. The list processor 62, in its simplest and currently preferred form, performs a sequential comparison between the concatenated text segment and a synonymics list 64 of text segments. Failure to match with a synonymic text segment results in the list processor 62 signaling an error manager 68 of the occurrence and the generation of an appropriate error message that is passed to the display manager 40. However, if a match is found, an associated task list 66 is referenced to produce a vector corresponding to the synonymic text segment matched. The vector allows control of the system to be passed temporarily to the particular task element $38_x$ pointed to by the vector.

Before considering further the details of the synonymic 64 and task 66 lists, it is important to recognize that the exact content of the various text segments is largely unimportant. They are mere patterns that desirably result in a matching between that provided by the operator and at least one of those present in the synonymics list 64. Consequently, the semantic value of the text segments is effectively independent of the function sought to be achieved. The operator is thus free, as will be described in greater detail below, to establish the content of the text segments as best suits the operator's needs by describing the function desired in descriptive terms that are the most significant to the operator. Thus, describing the user interface of the present invention as a natural language interface is true, particularly from the perspective of the operator. However, the system 30 as a whole makes no heuristic attempt to understand the text segments, at least in its presently preferred embodiment.

Also to be considered is that while only one synonymics list 64 and corresponding task list 66 is shown in FIG. 4, preferably several pairs of such lists are provided. Indeed, three loose categories of synonymics have been identified as useful, particularly when the immediate memory of the system is limited. The preferred categories are: systemics, anecdotals, and topicals. Systemics relate to generally global functions necessary for the overall management of the system 30 by the operator. Topicals relate to fairly specific functions used to perform a specific user application and thus characteristically relate to highly interacting tasks, particularly with regard to common or shared data. Anecdotals relate generally to those remaining functions that, while directed to the performance of a particular application or applications, are not highly interdependent on one another, i.e., are global, yet relevant with regard only to a portion of the overall system 30. By utilizing this manner of classification, of preference where only one such list pair 64, 66 can desirably be maintained in immediate memory, there is an enhanced likelihood of sucessive text segment matches occurring with regard to the currently present synonymic list 64. Although the use of multiple lists 64, 66, with or without any particular categorization scheme, is optional, it is preferred in the present invention that such multiple lists 64, 66 be implemented to allow the creation of several synonymics/task libraries. In such case, the synonymics lists 64, themselves, optimally form task glossaries that can be viewed and reviewed, as needed, by the operator.

Figure 5:
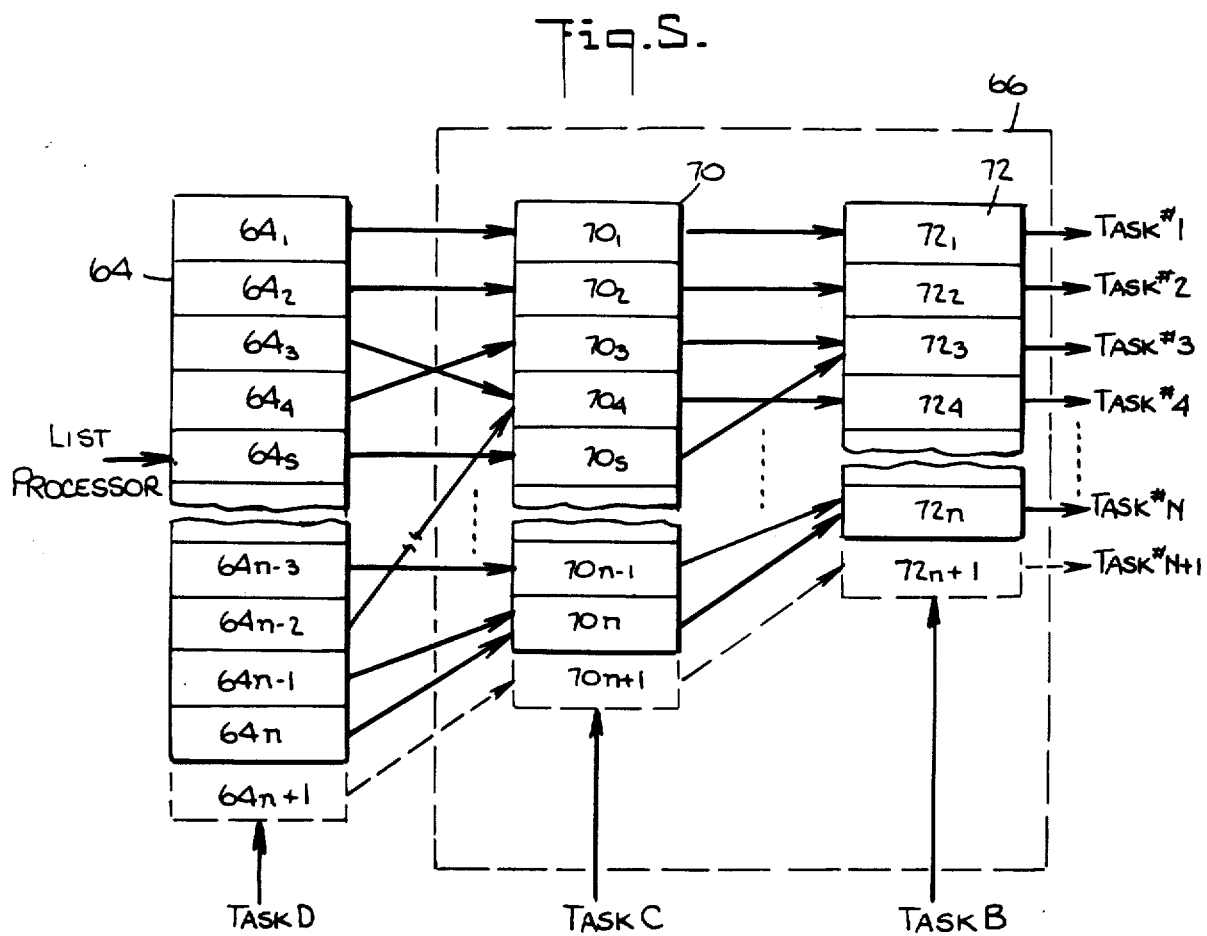
FIG. 5 is a detail view of a portion of the parser of the preferred embodiment of the present invention.

Considering now FIG. 5, the possible relations that can exist between the synonymic list 64 and the task list 66, as comprised of control 70 and vector 72 lists, are illustrated. The individual synonymic segments $64_1$–$64_n$ correspond to one or more control segments $70_1$–$70_n$ of the control list 70. As illustrated, the ordering of these relationships is generally of no particular concern. Multiple referencing of singular control segments $70_1$–$70_n$ allows the operator to use several input text segments, each appropriately descriptive in respectively differing circumstances as may occur between differing applications, to invoke a common task. Also, the multiple referencing of a common task allows syntax error variants of command to be anticipated and properly recognized for the intended command. Thus, the present invention permits the construction of an error tolerent environment for the benefit of the operator.

The control segments $70_1$–$70_n$ each may contain qualifying data to effectively personalize a corresponding, subsequently called task. Thus, several control segments $70_{3,5}$ may be associated with a single task $38_3$ through a common task vector $72_3$ of the vector list 72, yet achieve distinctly different functions due to the qualifying data personalization of the task $38_3$. If no qualifying data is present, then the default function of the task subsequently referenced is performed.

Alternately, the qualifying data may be entered by the operator as part of the input text segment. The list processor 62, in searching the synonymics list 64 for a match, recognizes a valid match when the initial, or task identifying portion of the concatenated text segment, matches the synonymic text segment. The remaining portion of the concatenated text segment, if any portion remains, is then treated as the qualifying data by the parser 36 and passed to the subsequently referenced task $38_1$–$38_n$.

Both of these task personalization methods are provided for by the present invention, either individually or in combination. Naturally, task personalization may be omitted in any particular embodiment of the present invention. Further, it should be understood that the several lists 64, 70, 72 need not be completely separate lists within the system 30, but rather exist as one or more merged lists such as variously permitted by the use of high level languages.

As further illustrated in FIG. 5, the lists 64, 70, 72 may be modified as by tasks, here identified as TASKs B, C, and D, as a result of their operation. In particular, a systemic TASK B may be invoked to add a task vector $72_{n+1}$ to the vector list 72, thereby effectively integrating a newly available task $38_{n+1}$ into the system 30. An anecdotal TASK C may then be used to add an appropriate control text segment, and qualifying data if needed or desired, to the control list 70. A topical TASK D may similarly be used to add any desired synonymic text segments to the synonymic list 64. Naturally, TASK C and, in particular, TASK D can be used to add text segments and form corresponding new relationships between the lists 64, 70, 72 or to simply modify the existing relationships.

Figure 6:
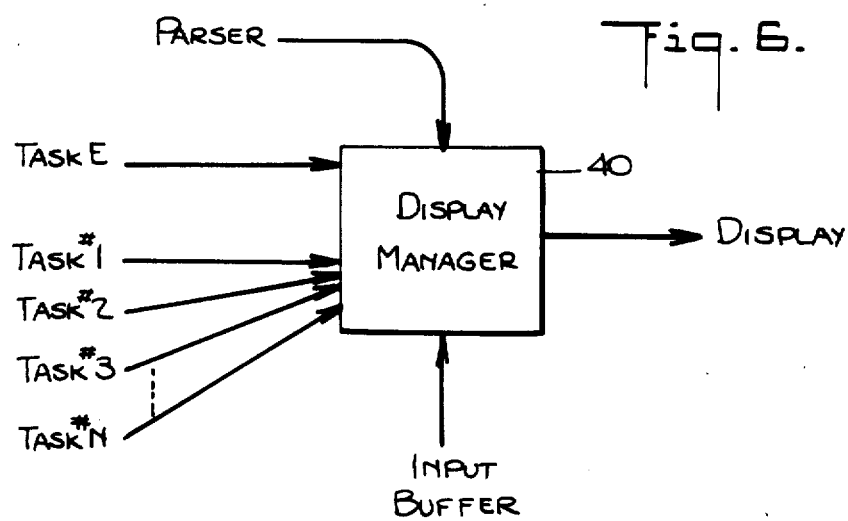
FIG. 6 is a block diagram of the display manager of the preferred embodiment of the present invention.

The parser 38 concludes its function by passing control to a selected task $38_1$-$38_n$ as referenced by its corresponding vector $72_1$-$72_n$ in the vector list 72. As illustrated in FIG. 6, each task $38_1$-$38_n$ communicates with the operator through the user interface by passing textual, or symbolic, information to the display manager 40. The information is displayed, as described above, on an appropriate display level. Preferably, an anecdotal TASK E is provided to allow discretionary control of the placement of the various intermediate display planes, such as the planes 18, 20, 24 and, in particular, the auricle plane 14 so as not to continually obscure the information on the respective relatively posterior planes. Further, the TASK E preferably allows individual display planes to be cleared, effectively rendering them invisible with respect to posterior planes, and sequentially repositioned so as to reverse the relatively posterior position of one or more display planes. Consequently, the information present in the distinction as to which task produced specific displayed information, at a minimum, is preserved by its representation on separate display planes. Additionally, the significance of this relational information can be discretionally modified by the operator to reflect by selectively rearranging and releasing particular planes.

Thus, an integrated environment computer system control structure having a natural language input and perceptually relational response output user interface has been described.

It should be understood, of course, that the foregoing dislosure relates only to the preferred embodiment of the present invention and that numerous modifications may be made without departing from the nature and scope of the present invention. For example, a mouse, touch pad or light pen may be used to enter text indirectly or simply text related symbols, such as icons, that are used in place of the preferred textual representations thereof. Further, simple design changes, such as performing the string concatenation of the input text segment in line with the passing of keystroke data to the input buffer as well as parsing the contents of the input buffer immediately following each operator keystroke, are considered reasonable equivalencies to the preferred structure of the present invention. It is therefore to be understood that, within the scope of the appended claims, the present invention may be practiced otherwise than as specifically described.

I claim:

1. A computer system including a memory and comprising:
   (a) means for the input of textual information;
   (b) means for the display of textual information;
   (c) a display manager associated with said text input means for receiving text therefrom, and further associated with said text display means for the perceptual representation of the text received from said text input means on a given one of one or more display levels, said levels being perceptually plane parallel successively posteriorly positioned with respect to a first given level;
   (d) an input text buffer associated with said text input means for receiving text therefrom;
   (e) a parser associated with said input buffer for periodically receiving text accumulated by said input text buffer and preparing an input text segment therefrom;
   (f) a list buffer including a plurality of synonymic text segments; and
   (g) a plurality of operative task elements stored in the memory, each associated with at least one of said synonymic text segments of said list buffer, said parser including a list processor for comparing said input text segment with said synonymic text segments and for causing performance of the task element associated with the synonymic text segment that corresponds to said input text segment, each of said task elements being further associated with said display manager whereby text provided by performed task elements is directed to and perceptually represented on said posterior display levels.

2. The system of claim 1 further characterized in that said input text buffer is further associated with said display manager whereby the text received from said text input means is directed to and perceptually represented on said first given display level.

3. The system of claim 2 further comprising a control buffer including a plurality of control segments, each of said control segments being associated with one or more of said synonymic text segments, one or more of said control segments being correspondingly associated with a respective one of said task elements whereby the selection of a particular task element and the specification of its function is established by the text received from said text input means.

4. The system of claim 3 further comprising an input text list buffer associated with said input text buffer for periodically receiving text accumulated by said input text buffer and sequentially storing said periodically received text whereby, in response to the function of a task element, said periodically received text is sequentially returned to said input text buffer and subsequently sent to said parser.

5. A method of allowing natural language terms to be used to control selection and performance of a plurality of operative tasks stored in the memory of a computer which also includes an input means, the method comprising the steps of:
   (a) storing in the computer memory a control list containing a plurality of control strings, each of which is associated with a respective one of said tasks for causing performance of the task associated with a selected control string;
   (b) storing in the computer memory a synonymic list containing a plurality of synonymic character strings, each of which is a natural language term associated with one of said control strings for causing selection of the control string associated with a selected synonymic character string;
   (c) receiving an input string of one or more characters from said input means, said input string being a natural language term; and
   (d) comparing said input string to the strings in said synonymic list to cause selection of the synonymic character string that matches the input string, which in turn causes selection of the associated control string and performance of the associated task.

6. The method of claim 5 wherein said comparing step comprises the steps of:
   (a) concatenating said input string; and (b) incrementally comparing said input string to each synonymic character string of said synonymic list until a match is determined.

7. The method of claim 6 wherein said comparing step further comprises the steps of:
   (a) determining the particular control string associated with said matched synonymic string; and
   (b) acquiring said control string for later reference.

8. The method of claim 7 wherein said comparing step further comprises the steps of:
   (a) determining the particular task associated with said acquired control string; and
   (b) passing said control string to said particular task; and
   (c) invoking said particular task.

9. The method of claim 5 or 8 wherein the computer system further comprises display means and the method further comprises the step of displaying an output string of one or more characters sent by said activated task to said display means.

10. The method of claim 9 wherein sid output string displaying step further comprises the steps of:

(a) selecting a display plane of said display means from a series of said display planes provided thereby for the display of said output string, said display planes being partially overlapping so as to perceptually appear sequentially posteriorly positioned with respect to a first given display plane, the criteria for selecting said display plane comprising:
   (i) that said display plane be posteriorly positioned with respect to said first given display plane;
   (ii) that said display plane be least obscurring of previously selected display planes; and
   (iii) that said display plane itself is not obscured by said previously selected display planes; and
(b) passing said output string to said display means such that said output string is perceptually displayed on said selected display plane.

11. The method of claim 10 wherein the step of receiving an input string further includes the step of passing said input string to said display means such that said input string is perceptually displayed on said first given display plane.

* * * * *